United States Patent
Uesugi

(10) Patent No.: US 10,291,044 B2
(45) Date of Patent: May 14, 2019

(54) BATTERY CHARGER AND CONTROL METHOD THEREOF

(71) Applicant: MAKITA CORPORATION, Anjo-shi, Aichi (JP)

(72) Inventor: Hiroki Uesugi, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 280 days.

(21) Appl. No.: 15/175,509

(22) Filed: Jun. 7, 2016

(65) Prior Publication Data

US 2016/0359350 A1    Dec. 8, 2016

(30) Foreign Application Priority Data

Jun. 8, 2015    (JP) ................................ 2015-115876

(51) Int. Cl.
*H02J 7/00* (2006.01)
*H02J 3/02* (2006.01)
(Continued)

(52) U.S. Cl.
CPC .............. *H02J 7/0044* (2013.01); *H02J 3/02* (2013.01); *H02J 7/0004* (2013.01); *H02J 7/007* (2013.01);
(Continued)

(58) Field of Classification Search
CPC ....... H02J 7/0004; H02J 7/0026; H02J 7/0044
(Continued)

(56) References Cited

U.S. PATENT DOCUMENTS

| 2001/0011884 A1 | 8/2001 | Sakakibara |
| 2002/0000788 A1* | 1/2002 | Ostergaard ............ H02J 7/0004 320/128 |

(Continued)

FOREIGN PATENT DOCUMENTS

| EP | 2244350 A2 | 10/2010 |
| EP | 2562906 A2 | 2/2013 |

(Continued)

OTHER PUBLICATIONS

Aug. 26, 2016 Extended Search Report issued in European Patent Application No. 16173176.5.

(Continued)

*Primary Examiner* — Edward Tso
*Assistant Examiner* — Aaron Piggush
(74) *Attorney, Agent, or Firm* — Oliff PLC

(57) ABSTRACT

A battery charger in one aspect of the present disclosure includes an attachment portion, a charging circuit, a positive electrode terminal, a negative electrode terminal, at least one signal input terminal, an analog value acquisition device, a charging current detector, a comparison processor, and a current value reflection processor. The current value reflection processor performs one of a variable determination process for reference values and an analog value correction process. The variable determination process is a process for the current value reflection processor to variably determine the reference value based on a value of a charging current detected by the charging current detector. The analog value correction process is a process for the current value reflection processor to correct an analog value to be used in a comparison by the comparison processor based on the value of the charging current detected by the charging current detector.

18 Claims, 6 Drawing Sheets

(51) Int. Cl.
*H02J 9/06* (2006.01)
*H02J 7/04* (2006.01)
*G08B 5/38* (2006.01)
*G08B 7/06* (2006.01)
*G08B 19/00* (2006.01)

(52) U.S. Cl.
CPC .......... *H02J 7/0021* (2013.01); *H02J 7/0026* (2013.01); *H02J 7/0052* (2013.01); *H02J 9/061* (2013.01); *G08B 5/38* (2013.01); *G08B 7/06* (2013.01); *G08B 19/005* (2013.01); *H02J 7/0086* (2013.01); *H02J 7/0091* (2013.01); *H02J 7/045* (2013.01); *H02J 7/047* (2013.01); *Y02B 40/90* (2013.01)

(58) Field of Classification Search
USPC .................. 320/107, 113, 128, 136, 162
See application file for complete search history.

(56) References Cited

U.S. PATENT DOCUMENTS

| | | | |
|---|---|---|---|
| 2010/0270973 | A1 | 10/2010 | Miyazaki et al. |
| 2013/0049678 | A1* | 2/2013 | Li .................. H02J 7/008 320/107 |
| 2015/0372512 | A1 | 12/2015 | Umemura et al. |
| 2016/0181829 | A1* | 6/2016 | Huang ............... H02J 7/007 320/162 |

FOREIGN PATENT DOCUMENTS

| | | |
|---|---|---|
| EP | 2961025 A1 | 12/2015 |
| JP | H09-271147 A | 10/1997 |
| JP | 2001-211559 A | 8/2001 |
| JP | 3375822 B2 | 2/2003 |
| JP | 2010-057250 A | 3/2010 |
| JP | 2013-233057 A | 11/2013 |
| JP | 2013-239425 A | 11/2013 |
| WO | 99/17418 A1 | 4/1999 |

OTHER PUBLICATIONS

Nov. 3, 2017 Office Action issued in European Patent Application No. 16173176.5.
Oct. 9, 2018 Office Action issued in Japanese Patent Application No. 2015-115876.

* cited by examiner

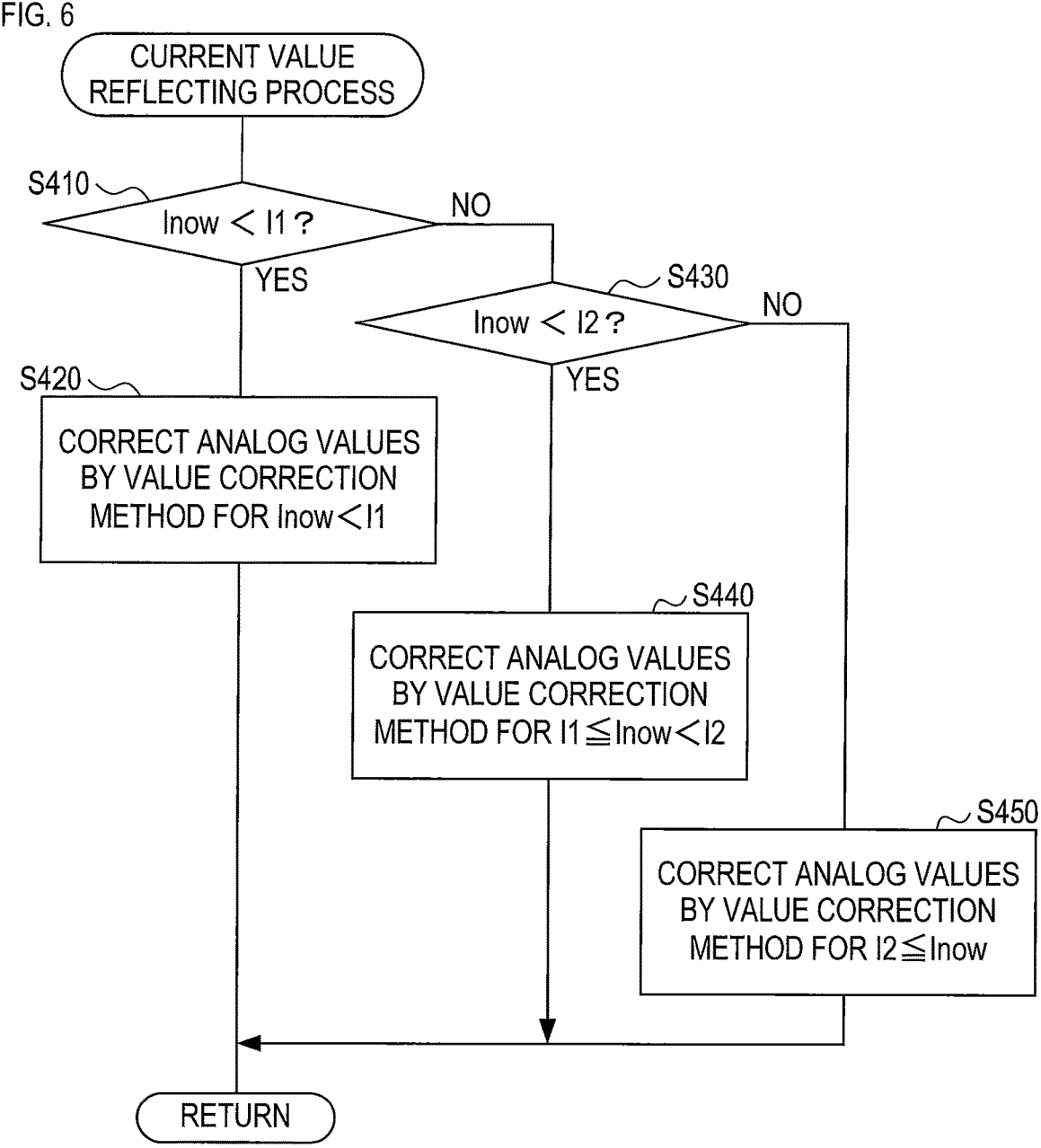

BATTERY CHARGER AND CONTROL METHOD THEREOF

CROSS-REFERENCE TO RELATED APPLICATIONS

This application claims the benefit of Japanese Patent Application No. 2015-115876 filed Jun. 8, 2015 in the Japan Patent Office, the disclosure of which is incorporated herein by reference.

BACKGROUND

The present disclosure relates to a battery charger.

A battery charger is known which is configured such that a battery pack with a battery stored therein is attachable and detachable so as to charge the battery when the battery pack is attached.

This type of battery chargers and battery packs are each provided with a positive electrode terminal and a negative electrode terminal for allowing the passage of charging current. When the battery pack is attached to the battery charger, a positive electrode terminal of the battery charger and a positive electrode terminal of the battery pack are electrically coupled while the negative electrode terminal of the charger and the negative electrode terminal of the battery pack are electrically coupled. This state allows supply of charging current from a charging power supply circuit of the charger to batteries.

Some of known battery chargers are each provided with a signal input terminal disposed separately from the terminals for charging current in order to obtain from a battery pack an analog signal indicating various information related to the inside of the battery pack (including the temperature and the voltage of battery cells).

When a battery pack having a signal output terminal that outputs the analog signal indicating the various information is attached to the battery charger, the signal input terminal of the battery charger and the signal output terminal of the battery pack are electrically coupled. Through these terminals, the analog signal is inputted from the battery pack to the battery charger.

A signal processor of a battery charger for processing an analog signal (for example, a microcomputer) obtains various information based on the analog signal inputted from the battery pack. The signal processor also monitors the state of a battery and controls charging of the battery based on the obtained information.

For example, in a case where the battery pack is provided with a thermistor for detecting the temperature of a battery and configured such that the voltage of the thermistor indicating the temperature of the battery is outputted in the form of an analog signal from the signal output terminal, the signal processor of the battery charger is capable of detecting the temperature of the battery based on the analog signal (i.e., the voltage of the thermistor) inputted from the battery pack through the signal input terminal. Subsequently, the signal processor, for example, compares the detected temperature with a threshold. If the detected temperature exceeds the threshold, it is determined that the temperature of the battery is high, and the signal processor performs a predetermined process (for example, forcible stop of charging).

The signal processor described above detects an electrical potential (voltage value) of the analog signal with respect to the reference potential (to be also referred to as "ground") set in the battery charger. The ground may be set at any suitable point. The ground may be set, for example, at the negative electrode terminal (that is, the negative electrode of the charging power supply circuit) as in a first example disclosed in the publication of Japanese Patent No. 3375822. Alternatively, for example, a ground and a ground terminal for the analog signal may be disposed separately from the negative electrode terminal so as to provide an independent transmission path for the analog signal separately from the transmission path for charging current as in a second example disclosed in the Unexamined Japanese Patent Application Publication No. 2001-211559.

SUMMARY

However, in a case wherein the ground for the analog signal is shared with the ground for the power supply circuit for charging in common as described in the first example, the electric potential of the analog signal is affected by the charging current, as a result of which the accuracy of the analog signal may be reduced. That is, in a case of the ground being shared in common, charging current flows also in some portion of the transmission path of the analog signal and consequently causes a voltage drop due to the charging current. Due to the influence of the voltage drop, the accuracy of the analog signal decreases, unreliable information may be detected based on the inaccurate analog signal.

If an analog signal with low accuracy is inputted and the signal processor performs various processes based on such inaccurate analog signal, the processes may not bring about a normal result. For example, in a case wherein a battery charger is configured such that a signal indicating the temperature of the battery is inputted in the form of an analog signal, a value indicating temperature that is different from the actual temperature of the battery may be inputted due to the influence of the charging current.

In this case, the signal processor of the battery charger incorrectly recognizes the inaccurate temperature of the battery, which is different from the actual temperature of the battery, as the actual temperature of the battery. The difference between the temperature indicated by the analog signal and the actual temperature varies depending on the magnitude of the charging current. The incorrectly recognized temperature is compared with the threshold, and determination is made whether the battery is in a high-temperature state, which may bring about an incorrect determination result.

One way to inhibit the influence of the detection error caused by the charging current may be for example, to temporarily reduce the charging current to a specific amount and maintain the charging current at the specific amount whenever the analog signal is detected (obtained). Consequently, the influence of the detection error caused by the charging current can be inhibited. This way, however, requires reduction of the charging current to a specific amount and maintaining of the charging current at the specific amount whenever the analog signal is detected, which makes the charging time long and may reduce the charging efficiency.

On the other hand, if the ground for the analog signal is provided separately from the ground for the charging current as described in the second example, the above-mentioned problem can be inhibited. This way, however, requires to provide both of battery charger and the battery pack with ground terminals for analog signals separately from the negative electrode terminal, which may increase the size and the cost of the battery charger and the battery pack.

It is preferable that one aspect of the present disclosure can inhibit reduction in the charging efficiency of the battery charger, and can inhibit increase of the cost and the size of the battery charger while performing processes in an accurate manner based on the analog signal inputted from the battery pack.

The battery charger according to one aspect of the present disclosure comprises an attachment portion, a charging circuit, a positive electrode terminal, a negative electrode terminal, at least one signal input terminal, an analog value acquisition device, a charging current detector, a comparison processor, and a current value reflection processor.

The attachment portion is configured such that a battery pack is detachably attached thereto. The battery pack comprises: a battery having a positive electrode and a negative electrode; and at least one signal output terminal. The at least one signal output terminal is configured to output an analog signal with an analog value. The charging circuit is configured to generate charging current for charging the battery. The positive electrode terminal is configured to be electrically coupled to the positive electrode of the battery in the battery pack when the battery pack is attached to the attachment portion and to output the charging current generated in the charging circuit to the positive electrode. The negative electrode terminal is configured to be electrically coupled to the negative electrode of the battery in the battery pack when the battery pack is attached to the attachment portion and to receive the charging current generated in the charging circuit from the negative electrode. An electric potential of the negative electrode terminal is set to a reference potential of the charging circuit. The at least one signal input terminal is configured to be electrically coupled to the at least one signal output terminal in the battery pack when the battery pack is attached to the attachment portion and to be such that the analog signal is inputted from the at least one signal output terminal. The analog value acquisition device is configured to acquire the analog value of the analog signal inputted to the at least one signal input terminal. The analog value obtained by the analog value acquisition device corresponds to a voltage value of the analog signal with respect to the reference potential. The charging current detector is configured to detect a value of the charging current. The comparison processor is configured to make comparison of a target value based on the analog value obtained by the analog value acquisition device with a predetermined reference value and to perform a predetermined process based on a result of the comparison.

The current value reflection processor is configured to perform one of a variable determination process for reference values and an analog value correction process. The variable determination process for reference values is a process for the current value reflection processor to variably determine the reference value based on the value of the charging current detected by the charging current detector. The analog value correction process is a process for current value reflection processor to correct the analog value to be used in the comparison by the comparison processor based on the value of the charging current detected by the charging current detector.

In the battery charger configured as mentioned above, the variable determination process for reference values or the analog value correction process is performed.

The variable determination process for reference values enables variable determination of an appropriate reference value in which the voltage value to be added, due to the charging current, to the voltage value of the analog signal is considered. Moreover, the analog value correction process enables appropriate correction of the analog value of the analog signal in which the voltage value to be added due to the charging current is considered, and the analog value of the analog signal is corrected corresponding to the voltage value to be added (for example, voltage components due to the charging current are cancelled). Therefore, the process based on the analog signal inputted from the battery pack can be accurately performed while the reduction in the charging efficiency and increase in the cost and the size of the battery charger can be inhibited.

The comparison target value may be suitably determined, which may be, for example, the analog value itself, may be an amount of change in the analog value per predetermined period of time (i.e., rate of change), or may be the difference between two different analog values.

The analog values may indicate an internal state of the battery pack.

The current value reflection processor may be configured to perform the variable determination process for reference values. In such a case, the current value reflection processor may be configured to variably determine the reference value so that the relationship between the value of the charging current detected by the charging current detector and the reference value becomes such that the reference value generally increases with the value of the charging current when the current value reflection processor performs the variable determination process for reference values.

As the value of the charging current increases the value of the voltage to be added, due to the charging current, to the voltage value of the analog signal also increases, which may correspondingly increase the analog value of the analog signal. The reference value, therefore, may be variably determined so as to generally increase with the value of the charging current.

The current value reflection processor may perform the analog value correction process. In such a case, when the current value reflection processor performs the analog value correction process, the current value reflection processor may reduce the analog value to be used in the comparison so that the analog value becomes smaller than the analog value of the analog signal inputted to the at least one signal input terminal.

When the current value reflection processor performs the analog value correction process, the current value reflection processor may reduce the analog value to be used in the comparison to a greater extent as the value of the charging current detected by the charging current detector increases.

That is, contrary to the variable determination process for reference values in which the reference value is varied corresponding to the value of the charging current, the analog value is corrected corresponding to the value of the charging current. In this way, the voltage to be added, due to the charging current, to the analog value of the analog signal can be canceled.

The battery may comprise a plurality of cells.

The at least one signal output terminal may comprise at least one cell voltage output terminal configured to output a cell voltage signal. The cell voltage signal may be an analog signal having an analog value that corresponds to a voltage value of one of the plurality of cells.

The at least one signal input terminal may comprise at least one cell voltage input terminal configured to be electrically coupled to the at least one cell voltage output terminal when the battery pack is attached to the battery charger and to be configured such that the cell voltage signal is inputted from the at least one cell voltage output terminal.

The analog value acquisition device may be configured to acquire at least the analog value of the cell voltage signal inputted to the at least one cell voltage input terminal.

In the battery charger configured as mentioned above, the predetermined process based on the cell voltage signal (i.e., the predetermined process based on the voltage of the cell of the battery) can be accurately performed while the influence of the charging current is inhibited.

The battery pack may comprise a temperature detector and a temperature signal output terminal. The temperature detector may be configured to output voltage corresponding to temperature of the battery. The at least one signal output terminal may comprise a temperature signal output terminal configured to output a temperature signal. The temperature signal may be an analog signal that has an analog value corresponding to the voltage outputted from the temperature detector.

The at least one signal input terminal may comprise a temperature signal input terminal configured to be electrically coupled to the temperature signal output terminal when the battery pack is attached to the battery charger and to be configured such that the temperature signal is inputted from the temperature signal output terminal.

The analog value acquisition device may be configured to acquire at least the analog value of the temperature signal inputted to the temperature signal input terminal.

In the battery charger configured as mentioned above, the predetermined process based on the temperature signal (i.e., the predetermined process based on temperature of the battery) can be accurately performed while influence of the charging current is inhibited.

The analog value acquisition device may be configured to acquire an analog value corresponding to the voltage of the battery inputted from the battery pack to the positive electrode terminal.

In the battery charger configured as mentioned above, the predetermined process based on the analog signal inputted to the positive electrode terminal (i.e., the predetermined process based on the voltage of the battery) can be accurately performed while the influence of the charging current is inhibited.

The comparison processor may be configured to determine, upon performing the predetermined process, whether abnormality has occurred in the battery pack based on the result of the comparison while the charging current is outputted to the battery pack.

The comparison processor may be configured to perform, upon occurrence of the abnormality in the battery pack being determined, a process to stop output of the charging current from the charging circuit to the battery pack.

In the battery charger configured as mentioned above, determination whether the abnormality has occurred in the battery pack can be accurately made while the influence of the charging current is inhibited. Accordingly, the charging current can be appropriately controlled corresponding to the presence or absence of the abnormality.

A control method of a battery charger according to another aspect of the present disclosure comprising:

inputting at least one analog signal from a battery pack to a battery charger, the battery pack comprising a positive electrode, a negative electrode, and at least one analog signal output terminal, the at least one analog signal having an analog value and being inputted to the battery charger through the at least one analog signal output terminal;

acquiring the analog value of the at least one analog signal, the analog value corresponding to a voltage value of the at least one analog signal with respect to a reference potential of the battery charger;

outputting a charging current from the battery charger to the battery pack, the charging current fluctuating the voltage value of the at least one analog signal with respect to the reference potential;

detecting a value of the charging current;

comparing a comparison target value based on the analog value obtained with a predetermined reference value;

performing a predetermined process based on a result of the comparing of the comparison target value with the reference value; and performing one of a variable determination process for reference values and an analog value correction process, the variable determination process for reference values being a process to variably determine the reference value based on the detected value of the charging current, the analog value correction process being a process to correct the analog value to be used in the comparing based on the detected value of the charging current.

In this way, while the reduction in the charging efficiency and the increase in the cost and the size of the battery charger are inhibited, the process based on the at least one analog signal inputted from the battery pack can be accurately performed.

BRIEF DESCRIPTION OF THE DRAWINGS

Exemplified embodiments of the present disclosure will now be described by way of examples with reference to the accompanying drawings, in which:

FIG. 6 is a flowchart showing another example of a current value reflecting process.

Figure 1:
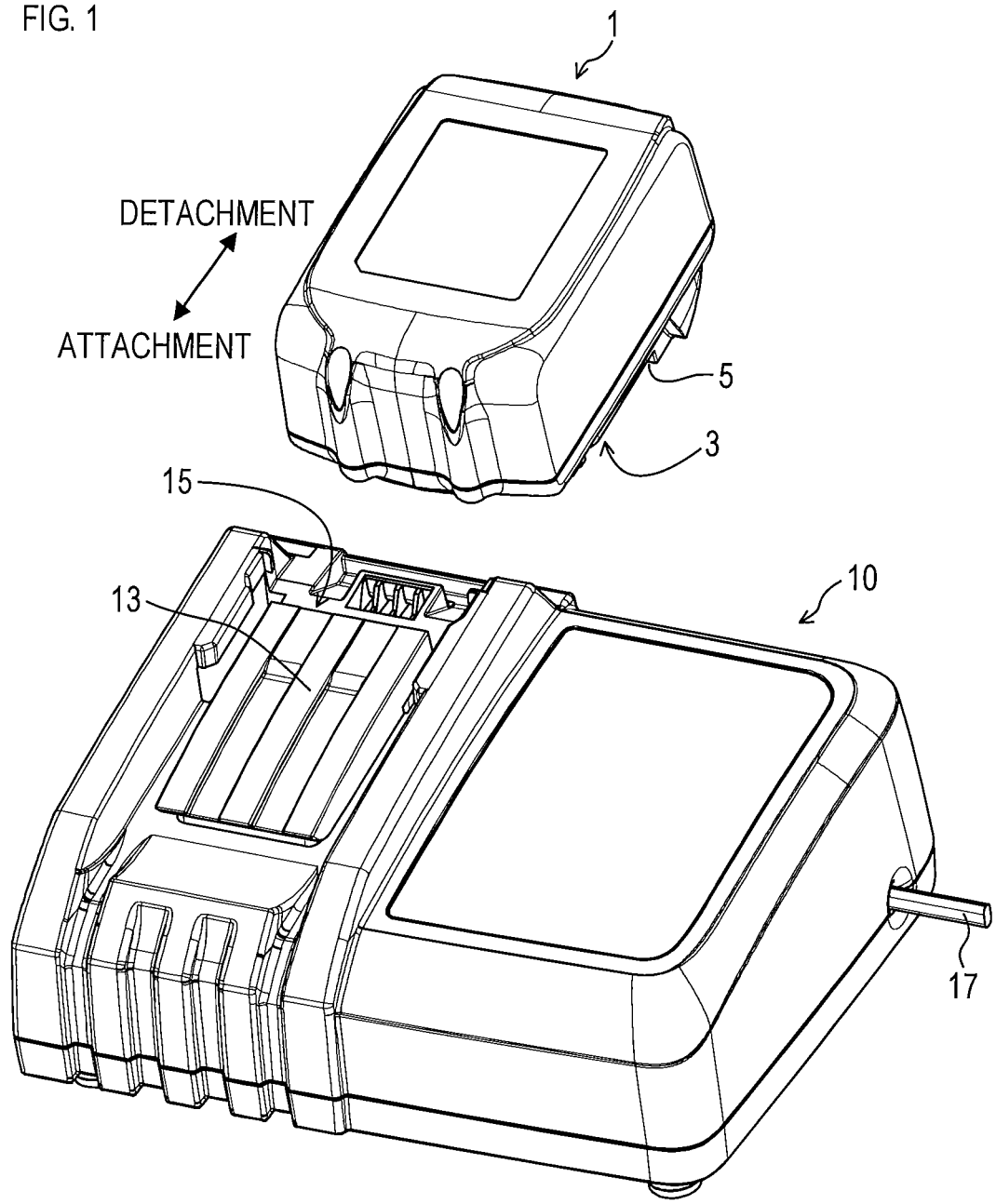
FIG. 1 is a perspective view showing an appearance of a battery charging system according to an embodiment.

DETAILED DESCRIPTION OF THE PREFERRED EMBODIMENTS (1) Schematic Structure of Battery Charging System As shown in FIG. 1, a battery charging system according to a present embodiment comprises a battery pack 1 and a battery charger 10. The battery pack 1 is configured, for example, to be detachably attachable to various rechargeable motor-driven apparatus, such as rechargeable electric power tools, rechargeable vacuum cleaners, and rechargeable mowers, and to be able to supply electric power to the drive source (for example, a motor) of such apparatus. The battery charger 10 is configured to be able to charge a battery 30 in the battery pack 1 (see FIG. 2).

The battery charger 10 receives supply of alternating current (AC) power through a power cord 17 from an external power supply (for example, a commercial AC power source), generates charging power (direct voltage (DC), DC current) for charging the battery 30 from the AC power, and supplies the generated charging power to the battery 30 in the battery pack 1.

On the top surface of the battery charger 10, an attachment portion 13 is provided so as to attach the battery pack 1 thereon. This attachment portion 13 is formed so as conform with the shape of an attachment portion 3 provided on the rear surface of the battery pack 1 so that the battery pack 1 can be attached to the battery charger 10 or detached from the battery charger 10 in a sliding manner.

The attachment portion 13 of the battery charger 10 is provided with a terminal unit 15 that can be engaged with the terminal unit 5 formed on the rear surface of the battery pack 1 when the battery pack 1 is attached to the attachment unit 13. The terminal unit 5 of the battery pack 1 is provided with a plurality of terminals 21-25 (see FIG. 2), which will be described hereinafter, while the terminal unit 15 of the battery charger 10 is provided with a plurality of terminals 41-45 (see FIG. 3), which will be also described hereinafter.

(2) Structure of Battery Pack 1

Figure 2:
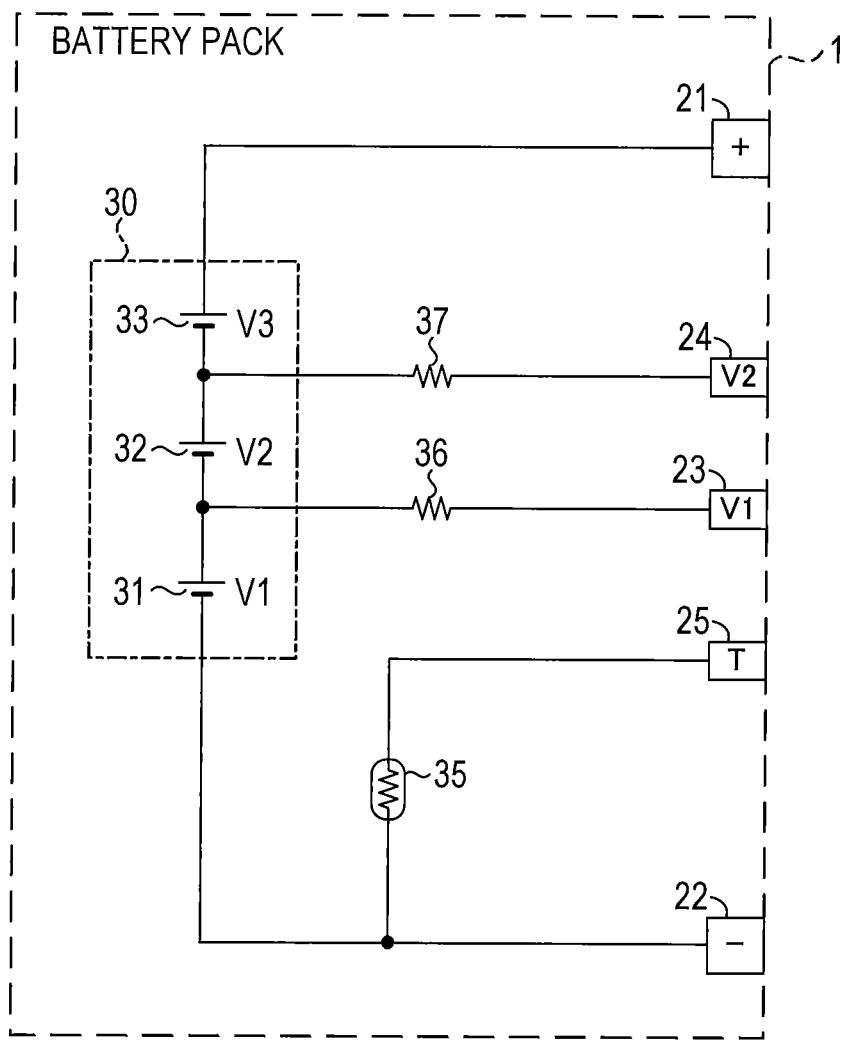
FIG. 2 is an electric circuit diagram of a battery pack according to the embodiment.

As shown in FIG. 2, the battery pack 1 comprises a positive electrode terminal 21, a negative electrode terminal 22, V1 output terminal 23, V2 output terminal 24, and a temperature output terminal 25. When the battery pack 1 is attached to the battery charger 10, these terminals are electrically coupled to the battery charger 10. The battery pack 1 accommodates the battery 30.

When the battery pack 1 is attached to, for example, the battery charger 10, the charging power outputted from the battery charger 10 is supplied through the positive electrode terminal 21 and the negative electrode terminal 22 of the battery pack 1 to the battery 30. When the battery pack 1 is attached, for example, to a rechargeable motor-driven apparatus, the electric power for the operating the rechargeable motor-driven apparatus is outputted from the battery 30 through the positive electrode terminal 21 and the negative electrode terminal 22.

The battery 30 comprises a plurality of rechargeable battery cells (to be simply referred to as "cell") that are rechargeable and dischargeable. These cells are connected to one another in series. To be specific, in the present embodiment, the battery 30 comprises a first cell 31, a second cell 32, and a third cell 33 that are coupled in series.

The positive electrode of the battery 30 (i.e., the positive electrode of the third cell 33) is coupled to the positive electrode terminal 21, while the negative electrode of the battery 30 (i.e., the negative electrode of the first cell 31) is coupled to the negative electrode terminal 22. The battery 30 according to the present embodiment may be any type of rechargeable battery, which may be, for example, a lithium ion rechargeable battery.

The positive electrode of the first cell 31 is coupled to the V1 output terminal 23 through a resistor 36, while the positive electrode of the second cell 32 is coupled to the V2 output terminal 24 through a resistor 37. The V1 output terminal 23 outputs the voltage value of the first cell 31 (i.e., a first cell voltage value V1) to the exterior of the battery pack 1. The V2 output terminal 24 outputs the voltage value of the second cell 32 (i.e., a second cell voltage value V2) to the exterior of the battery pack 1.

In the battery pack 1, a thermistor 35 is provided. The thermistor 35 is disposed in the proximity of the battery 30 (for example, in the vicinity of any one of the cells), and detects the temperature of the battery 30 (battery temperature). A first end of thermistor 35 is coupled to the negative electrode terminal 22, while a second end of the thermistor 35 is coupled to the temperature output terminal 25.

Figure 3:
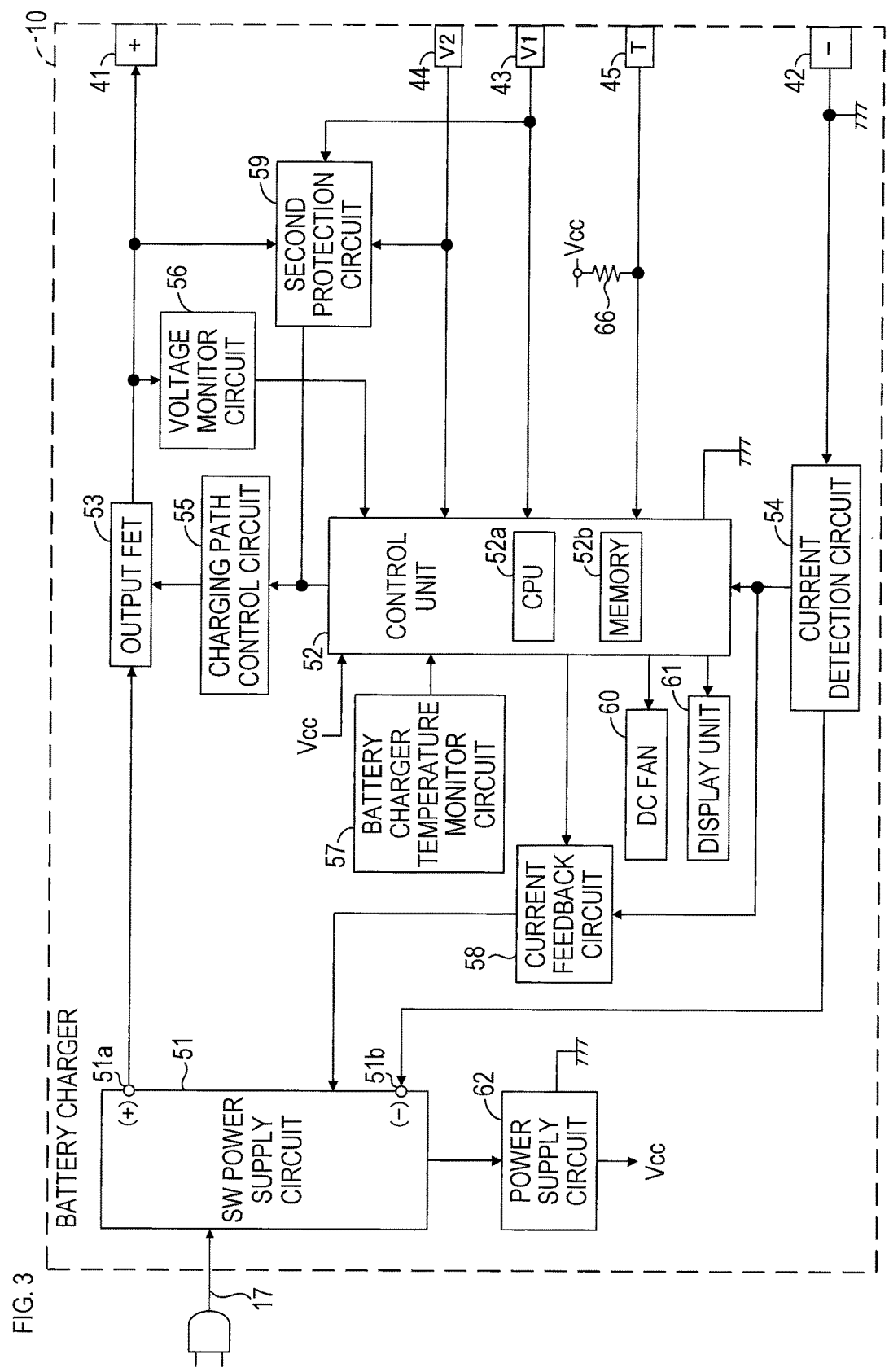
FIG. 3 is a block diagram showing an electrical structure of a battery charger according to the embodiment.

When the battery pack 1 is attached to the battery charger 10, the temperature output terminal 25 of the battery pack 1 is coupled to a temperature input terminal 45 of the battery charger 10 (see FIG. 3). In the battery charger 10, the temperature input terminal 45 is coupled to a control unit 52 and also to a first end of a resistor 66. To a second end of the resistor 66, power supply voltage Vcc having a predetermined DC voltage value is applied.

This structure allows, when the battery pack 1 is attached to the battery charger 10, a formation of a series circuit of the resistor 66 inside of the battery charger 10 and the thermistor 35 inside of the battery pack 1. The power supply voltage Vcc of the battery charger 10 is applied to this series circuit. The power supply voltage Vcc is "voltage divided" by the resistor 66 and the thermistor 35. The value of the divided voltage, i.e., the value of voltage across the thermistor 35 is outputted in the form of a signal indicating the temperature of the battery 30 (to be also referred to as a "battery temperature detection signal") from the temperature output terminal 25 of the battery pack 1 and inputted through the temperature input terminal 45 of the battery charger 10 into the control unit 52. The control unit 52 of the battery charger 10 obtains the temperature of the battery 30 based on the inputted battery temperature detection signal and recognizes the temperature.

As it will be described hereinafter, in the battery charger 10, a ground (reference potential) of the circuit in which the charging current flows and a ground for the circuit that allows the passage of electric current to the thermistor 35 are shared in common. Thus, the voltage value of the battery temperature detection signal that is recognized by the control unit 52 of the battery charger 10 when charging current flows into the battery pack 1 is not simply the value of the voltage across the thermistor 35, but rather a voltage value in which a value for voltage drop caused due to the charging current is added to the voltage across the thermistor 35.

(3) Structure of Battery Charger 10

As shown in FIG. 3, the battery charger 10 comprises a positive electrode terminal 41, a negative electrode terminal 42, V1 input terminal 43, V2 input terminal 44, and the temperature input terminal 45. These terminals 41-45 are electrically coupled to the battery pack 1 when the battery pack 1 is attached to the battery charger 10.

When the battery pack 1 is attached to the battery charger 10, the following electric couplings are established: the positive electrode terminal 41 of the battery charger 10 and the positive electrode terminal 21 of the battery pack 1, the negative electrode terminal 42 of the battery charger 10 and the negative electrode terminal 22 of the battery pack 1, the V1 input terminal 43 of the battery charger 10 and the V1 output terminal 23 of the battery pack 1, the V2 input terminal 44 of the battery charger 10 and the V2 output terminal 24 of the battery pack 1, and the temperature input terminal 45 of the battery charger 10 and the temperature output terminal 25 of the battery pack 1.

The battery charger 10 also comprises a switching (SW) power supply circuit 51 and the control unit 52.

The SW power supply circuit 51 generates charging power (charging current, charging voltage) for charging the battery 30 based on AC power supplied from an external power supply through the power cord 17 and outputs the generated charging power from the positive electrode output terminal 51a and the negative electrode output terminal 51b. In the battery charger 10, the positive electrode output terminal 51a of the SW power supply circuit 51 is coupled to the positive electrode terminal 41, while the negative electrode output terminal 51*b* of the SW power supply circuit 51 is coupled to the negative electrode terminal 42 (ground). The charging power generated in the SW power supply circuit 51 and outputted from the positive electrode output terminal 51*a* and the negative electrode output terminal 51*b* is supplied to the battery pack 1 through the positive electrode terminal 41 and the negative electrode terminal 42. The generation of the charging power by the SW power supply circuit 51 is controlled by the control unit 52.

The SW power supply circuit 51 comprises, for example, a rectifier circuit that rectifies AC power into DC power, a converter circuit that converts the DC voltage rectified by the rectifier circuit into voltage for charging the battery 30, and a smoothing circuit that smoothens the voltage converted by the converter circuit so as to generated DC charging power.

When the battery pack 1 is attached to the battery charger 10, a closed circuit for charging is formed in which the circuit starts from the positive electrode output terminal 51*a* of the SW power supply circuit 51 through an output FET 53, the positive electrode terminal 41, the battery pack 1, the negative electrode terminal 42, and a current detection circuit 54 and reaches the negative electrode output terminal 51*b* of the SW power supply circuit 51.

In order to connect and disconnect the conduction path between the SW power supply circuit 51 and the positive electrode terminal 21, the output FET 53 is disposed on this conduction path. The output FET 53 may comprise one FET or a combined circuit of a plurality of FETs. The output FET 53 may be turned on or off by switching signal from a charging path control circuit 55. When the output FET 53 is turned on, the above-described conduction path is coupled while when the output FET 53 is turned off, the above-described conduction path is disconnected.

The charging path control circuit 55 outputs a switching signal in accordance with a switching control command from the control unit 52. That is, when a switching control command to turn on the output FET 53 is inputted, the charging path control circuit 55 outputs a switching signal to turn on the output FET 53, while when a switching control command to turn off the output FET 53 is inputted, the charging path control circuit 55 outputs a switching signal to turn off the output FET 53.

The current detection circuit 54 is disposed on the conduction path between the negative electrode terminal 42 and the negative electrode output terminal 51*b* of the SW power supply circuit 51 and detects a value of charging current flowing through the conduction path. From the current detection circuit 54, a current detection signal indicating the value of the above-described charging current is outputted. The current detection circuit 54 may comprise, for example, a resistor disposed in series with the conduction path and a circuit to which the voltage across the both ends of the resistor is outputted in the form of a current detection signal. The current detection signal from the current detection circuit 54 is inputted to the control unit 52 and current feedback circuit 58.

The battery charger 10 further comprises a voltage monitor circuit 56 and a battery charger temperature monitor circuit 57. The voltage monitor circuit 56 is coupled to the conduction path between the output FET 53 and the positive electrode terminal 41, and outputs a voltage detection signal indicating the voltage value of this conduction path. When the battery pack 1 is attached to the battery charger 10, the voltage value Vb of the battery 30 (battery voltage value) is detected in the voltage monitor circuit 56, and a voltage detection signal indicating the voltage value Vb is inputted to the control unit 52.

The battery charger temperature monitor circuit 57 is disposed in a predetermined portion of the battery charger 10 and detects the temperature in the battery charger 10. The battery charger temperature monitor circuit 57 outputs a battery charger temperature detection signal that corresponds to the temperature in the battery charger 10. The specific configuration of the battery charger temperature monitor circuit 57 may be arranged in various ways as long as the battery charger temperature monitor circuit 57 can output information indicating the temperature in the battery charger 10. For example, a circuit configuration may be conceived in which a thermistor or a temperature detection element that is similar to the thermistor is used.

The control unit 52 has a plurality of functions including a function to control the charging of battery pack 1 attached to the battery charger 10. In the present embodiment, the control unit 52 comprises a CPU 52*a* and a memory 52*b*. The functions that the control unit 52 has are executed mainly by the CPU 52*a* running various programs stored in the memory 52*b*. In other embodiments, the control unit 52 may be a combination of various individual electronic components, may be an ASIC (Application Specified Integrated Circuit), may be a programmable logic device, such as a FPGA (Field Programmable Gate Array), or a combination of these.

When the battery pack 1 is attached to the battery charger 10, a battery temperature detection signal is inputted to the control unit 52 through the temperature input terminal 45. The control unit 52 has a function to detect the attachment of the battery pack 1 based on the battery temperature detection signal. The attachment of the battery pack 1 may be determined differently from the determination based on the battery temperature detection signal. For example, the attachment of the battery pack 1 may be determined based on a voltage detection signal from the voltage monitor circuit 56.

When the battery pack 1 is attached to the battery charger 10, the control unit 52 can obtain the first cell voltage value V1 based on an analog signal inputted from the V1 input terminal 43 (the voltage of the positive electrode of the first cell 31). The control unit 52 can also obtain the second cell voltage value V2 based on the difference between the voltage value of an analog signal inputted from the V2 input terminal 44 (the voltage of the positive electrode of the second cell 32) and the voltage value of an analog signal inputted from the V1 input terminal 43. The control unit 52 can further obtain the third cell voltage value V3 based on the difference between voltage value (i.e., battery voltage value Vb) of the analog signal (voltage detection signal) inputted from the voltage monitor circuit 56 and the voltage value of an analog signal inputted from the V2 input terminal 44.

When the battery pack 1 is attached to the battery charger 10, an analog battery temperature detection signal is inputted to the control unit 52 from the battery pack 1 through the temperature input terminal 45. The control unit 52 obtains the battery temperature based on the voltage value of the battery temperature detection signal and recognizes the battery temperature.

The battery charger 10 of the present embodiment is configured to charge the battery 30 of the battery pack 1 in accordance with Constant Current Constant Voltage (CCCV) charging method. Since the CCCV charging method is well known, the method is not explained here in detail. Only the general description of the method is given below. For simplification, a battery with one cell will be explained as an example.

In the CCCV charging method, when charging is initiated, first, constant charging current is supplied to the battery until a battery voltage value (equivalent to the cell voltage value of the one cell in the present example) reaches a predetermined set value of the charging voltage (to be also referred to as a "charging threshold"). In short, Constant Current (CC) charging is firstly performed. When the cell voltage value reaches the charging threshold, the charging is switched from the CC charging to a Constant Voltage (CV) charging. The charging is continued while charging current is adjusted so as to maintain the cell voltage value at the charging threshold. Subsequently, it is determined, based on, for example, the elapsed time after switching to the CV charging, the value of the charging current, the falling rate of the charging current, and so on, whether charging completion conditions by which the charging is to be ended have been met. If it is determined that charging completion conditions have been met, it is determined that the battery is in a fully charged state, and the supply of the charging current to the battery is stopped so as to complete the charging. In a case where the cell voltage value has reached or exceeded the charging threshold before the initiation of the CC charging, charging is not performed.

The battery 30 according to the present embodiment comprises a plurality of cells 31, 32, 33 coupled in series. In the battery charger 10 according to the present embodiment, the control unit 52 continues the CC charging until the largest value among the cell voltage values V1, V2, and V3 (to be also referred to as a "largest cell voltage value") reaches the charging threshold. That is, the control unit 52, while monitoring the cell voltage values V1, V2, and V3, calculates the value of charging current to be supplied to the battery 30, and outputs a charging control signal that indicates the value of the charging current to the current feedback circuit 58.

To the current feedback circuit 58, the charging control signal is inputted from the control unit 52 and the current detection signal is inputted from the current detection circuit 54. The current feedback circuit 58 compares the value of actual charging current indicated by the current detection signal inputted from the current detection circuit 54 with the target value of the charging current indicated by the charging control signal inputted from the control unit 52, and controls the SW power supply circuit 51 by outputting a control command so as to conform the value of the actual charging current to the target value to the SW power supply circuit 51. The SW power supply circuit 51 generates charging power in accordance with the control command inputted from the current feedback circuit 58 and outputs the generated charging power to the battery 30.

After the initiation of the CC charging, if it is determined that the highest cell voltage value has reached the charging threshold, the control unit 52 switches the charging to the CV charging. To be specific, based on the highest cell voltage value, the control unit 52, while maintaining the highest cell voltage value at the charging threshold, generates a charging control signal so as to continue the charging and outputs the generated signal to the current feedback circuit 58 so that the charging continues. When it is determined that the predetermined charging completion conditions have been met, the control unit 52 determines that the entire battery 30 is in the fully charged state and ends the charging.

It is merely an example that the control unit 52 switches the charging from the CC charging to the CV charging based on the highest cell voltage value and determines the establishment of the CV charging completion conditions. A charging threshold for the battery voltage value Vb may be set, for example, so that the control unit 52 perform the CCCV charging based on the battery voltage value Vb.

When the control unit 52 initiates a series of charging control for charging the battery 30 in accordance with the CCCV charging method, the control unit 52 outputs a switching control command to the charging path control circuit 55 so as to turn on the output FET 53. Then the output FET 53 is turned on, and the control unit 52 connects the conduction path from the SW power supply circuit 51 to the battery 30.

On the other hand, if it is determined, after the charging control is initiated, that the battery 30 is in the fully charged state, the control unit 52 stops the charging and terminates the charging control. To be specific, the control unit 52 outputs a predetermined signal to the current feedback circuit 58 so as to stop or reduce the charging current. Then, the charging current outputted from the SW power supply circuit 51 is stopped or reduced. The control unit 52 also outputs switching control command indicating so as to turn off the output FET 53 to charging path control circuit 55. Then, the output FET 53 is turned off, and the control unit 52 disconnects the conduction path from the SW power supply circuit 51 to the battery 30. Upon the termination of the charging control, the control unit 52 notifies the termination of the charging by, for example, turning on a LED of a display unit 61.

In a case where it is determined, after the initiation of the charging control, that the highest cell voltage value has been already reached or exceeded the charging threshold, the charging control is terminated without performing charging. Even in this case, the termination of the charging control is notified by, for example, turning on the LED of the display unit 61.

The battery charger 10 comprises a second protection circuit 59, a DC fan 60, and the display unit 61.

The second protection circuit 59 monitors the cell voltage values V1, V2, and V3 and the battery voltage value Vb of the battery 30 based on the voltage inputted from the V1 input terminal 43, the voltage inputted from the V2 input terminal 44, and the voltage of the positive electrode terminal 41. If it is determined that one of these voltage values meets predetermined overvoltage conditions, the second protection circuit 59 outputs a forcible off-command to the charging path control circuit 55 so as to forcibly turn off the output FET 53. Upon receiving the forcible off-command inputted from the second protection circuit 59, the charging path control circuit 55 forcibly turns off the output FET 53, irrespectively of the type of the switching control command from the control unit 52.

The DC fan 60 sends cooling air to the interior of the battery pack 1 (mainly to the battery 30) and the operation of the DC fan 60 is controlled by the control unit 52. While the battery pack 1 is attached to the battery charger 10, if it is determined that predetermined operation conditions are met (that is, the interior of the battery pack 1 needs to be cooled down) the control unit 52 operates the DC fan 60 so as to send the air to the battery pack 1.

The display unit 61 comprises a display device that can indicate various information. The display device may be, for example, an LED and a liquid crystal displays. In the present embodiment, the display unit 61 comprises at least one LED. The operation of the display unit 61 is controlled by the control unit 52.

The battery charger 10 comprises a power supply circuit 62. The power supply circuit 62 receives DC voltage generated in the SW power supply circuit 51 (for example, the output of the above-described rectifier circuit), converts the inputted voltage into a DC power supply voltage Vcc having a predetermined voltage value (for example, 5V), and outputs the DC power supply voltage Vcc. The power supply voltage Vcc outputted from the power supply circuit 62 is used as a power source for operating each of the devices disposed within the battery charger 10 (for example, the control unit 52, the DC fan 60, and so on). The power supply voltage Vcc outputted from the power supply circuit 62 is applied to the thermistor 35 of the battery pack 1 through the resistor 66 as described above.

(4) Abnormality Detection Function

The battery charger 10 according to the present embodiment is provided with abnormality detection function for detecting abnormality in the battery pack 1 based on various analog signals inputted from the battery pack 1. To be specific, in the present embodiment, the abnormality detection function includes at least unbalanced-cell-voltage detection function, temperature abnormality detection function, temperature-increase amount abnormality detection function, and voltage abnormality detection function. These abnormality detection functions are each achieved by the control unit 52 of the battery charger 10. The control unit 52 periodically repeats each of the abnormality detection function at least during the performance of the charging control.

The unbalanced-cell-voltage detection function is used so as to monitor the differences among the cell voltage values V1, V2, and V3 based on the above-described analog signals inputted from the battery pack 1, and determines, if the differences are large, that cell voltage values V1, V2, and V3 are correlatively in abnormal states (to be also referred to as "unbalanced-cell-voltage abnormality").

To be specific, the control unit 52 calculates the difference between the largest value and the smallest value among the cell voltage values V1, V2, and V3 (the largest voltage difference value Vdif) and determines whether the calculated largest voltage difference value Vdif is equal to a voltage difference threshold Vth or larger. If it is determined that the calculated largest voltage difference value Vdif is equal to the voltage difference threshold Vth or larger, the control unit 52 determines that unbalanced-cell-voltage abnormality has occurred. If the control unit 52 determines that unbalanced-cell-voltage abnormality has occurred while the unbalanced-cell-voltage detection function is being executed, the control unit 52 forcibly stops the charging control.

The temperature abnormality detection function is used so as to monitor the battery temperature based on the battery temperature detection signal that is one of the analog signals inputted from the battery pack 1. To be specific, the voltage value of the battery temperature detection signal is compared with a low temperature threshold VTa and a high temperature threshold VTb (<VTa). The temperature abnormality detection function is also used so as to determine that the temperature of the battery is in an abnormal state (to be also referred to as "temperature abnormality") if it is determined that the voltage value of the battery temperature detection signal is larger than the low temperature threshold VTa, or smaller than the high temperature threshold VTb (<VTa).

The thermistor 35 according to the present embodiment has negative characteristics in the relationship between the temperature and the resistant value, in which as the temperature increases, the resistant value of the thermistor 35 and consequently the voltage value of the battery temperature detection signal decreases. Thus, if the voltage value of the battery temperature detection signal is larger than the low temperature threshold VTa, it means that the battery temperature has become low. Contrarily, if the voltage value of the battery temperature detection signal is smaller than the high temperature threshold VTb, it means that the battery temperature has become high temperature. In other embodiments, the thermistor 35 may have positive characteristics in the relationship between the temperature and the resistant value in which as the temperature increases, the resistant value of the thermistor 35 and consequently the voltage value of the battery temperature detection signal increase.

Upon determination of temperature abnormality during execution of the temperature abnormality detection function, the control unit 52 forcibly stops the charging control.

The temperature-increase-amount abnormality detection function is used so as to monitor the increase amount of the battery temperature per predetermined period of time (rate of change) based on the battery temperature detection signal inputted from the battery pack 1 and, if the increase amount is large, determine that the temperature-increase-amount-abnormality has occurred. To be specific, it is determined that the temperature-increase-amount abnormality has occurred when a decrease amount of the voltage value of the battery temperature detection signal per predetermined period of time is equal to the temperature-increase-amount threshold $\Delta VT$ or larger.

While the temperature-increase-amount-abnormality detection function is being performed, if it is determined that the abnormality of the temperature-increase-amount has occurred, the control unit 52 forcibly stops the charging control.

The voltage abnormality detection function is used so as to monitor the cell voltage values V1, V2, and V3 and the battery voltage value Vb based on the above-described analog signals inputted from the battery pack 1 and to determine that the voltage of the battery 30 is in an abnormal state (to be also referred to as "voltage abnormality") if at least one of these voltage values is equal to the corresponding threshold or larger.

A first threshold is set for the first cell voltage value V1. Similarly, a second threshold for the second cell voltage value V2, a third threshold for the third cell voltage value V3, and a battery voltage threshold for the battery voltage value Vb are set. The control unit 52 forcibly stops the charging control, if it is determined that the voltage abnormality has occurred during the execution of the voltage abnormality detection function.

(5) Relationship Between Thresholds and Charging Current

In the battery charger 10, the voltage detection signal inputted from the positive electrode terminal 41 via the voltage monitor circuit 56 to the control unit 52, the voltage inputted from the V1 input terminal 43 into the control unit 52, the voltage inputted from the V2 input terminal 44 to the control unit 52, and a battery temperature detection signal inputted from the temperature input terminal 45 are all analog signals. The control unit 52 performs, based on these analog signals, various processes including the above-described abnormality detection function. That is, the control unit 52 detects voltage values with reference to the ground for each of the inputted analog signals described above, and performs various processes based on the detected values.

The ground that is referenced when the control unit 52 processes each of the above-described analog signals is the same ground as the ground for the charging current (located in the vicinity of the negative electrode terminal 42). That is, the ground for the charging current and the ground for processing analog signals are shared in common.

Consequently, the analog signals inputted to the control unit 52 when the charging current runs to the battery pack 1 from the SW power supply circuit 51 include errors generated due to the common ground.

Specific explanation is given with reference to an example of the battery temperature detection signal. When the battery pack 1 is attached to the battery charger 10, a closed circuit for generating a battery temperature detection signal is formed. The circuit extends from the power supply circuit 62 of the battery charger 10 through the resistor 66, the temperature input terminal 45, the temperature output terminal 25 of the battery pack 1, the thermistor 35, the negative electrode terminal 22 of the battery pack 1, and the negative electrode terminal of the battery charger 10 and reaches the power supply circuit 62.

Since the ground for the closed circuit and the ground for charging current are shared in common, when charging current runs from the SW power supply circuit 51 to the battery pack 1, in some part of the closed circuit (at least at each of the negative electrode terminals 22, 42 and some section of the wiring coupled to these terminals), a current outputted from the power supply circuit 62 based on the power supply voltage Vcc and a charging current outputted from the SW power supply circuit 51 also run. Consequently, during charging, the voltage value of the battery temperature detection signal that the control unit 52 detects with reference to the ground and are inputted from the temperature input terminal 45 is not genuine voltage values across both ends of the thermistor 35. The voltage value across both ends of the thermistor 35 is added with a value for voltage drop caused due to the above-described charging current.

Accordingly, the battery temperature that is obtained based on the battery temperature detection signal may include an error generated due to the above-described charging current.

Similarly to the battery temperature detection signal, various information that the control unit 52 obtains based on the other analog signals inputted from the battery pack 1 (for example, V1, V2, V3, and Vb) also includes an error generated due to the common ground that is also used for the charging circuit.

If the above-described abnormality detection functions are performed or the switching determination for switching from the CC charging to the CV charging is performed with detection values with such errors, incorrect results may be generated. For example, an abnormal state (for example, the battery temperature is at high temperature or low temperature) may be determined even if the actual state is normal (for example, the battery temperature is normal). On the other hand, the abnormal state may not be determined despite the actual abnormal state. Moreover, for example, after initiation of the CC charging, even if the cell voltage value has not yet actually reached the charging threshold, it may be wrongly determined that the cell voltage value has reached the charging threshold, and the charging may be switched to the CV charging.

Accordingly, the control unit 52 according to the present embodiment variably sets, during the charging control, at least some of the thresholds used in charging control (in the present embodiment, the thresholds that are used to perform the above-described abnormality detection functions, and the charging threshold), corresponding to the value of the charging current. To be specific, each of the thresholds are set such that the charging current increases with a continuous or gradual increase of the thresholds.

In the present embodiment, the values of the charging current are categorized into three regions, for example. For each of the regions, different threshold is set. To be specific, the value of the charging current is categorized into: a first region in which the value of the charging current is smaller than I1 (for example, 1A); a third region in which the value of the charging current is equal to I2 (for example, 2A) or larger; and a second region in which the value of the charging current is equal to I1 or larger and smaller than I2. A threshold is set in each region so as to be different from the thresholds in other regions and so that the threshold in the first region becomes the smallest and the threshold in the third region becomes the largest.

For example, in a case of the voltage difference threshold Vth used in performing the unbalanced-cell-voltage detection function, if the value of the charging current is within the first region (for example, smaller than 1A), the voltage difference threshold Vth is set to Vth1 (for example, 100 mV). If the value of the charging current is within the second region (for example, equal to 1A or larger and smaller than 2A), the voltage difference threshold Vth is set to Vth2 (for example, 200 mV). If the value of the charging current is within the third region (for example, equal to 2A or larger), the voltage difference threshold Vth is set to Vth3 (for example, 300 mV).

Regarding other values such as the low temperature threshold VTa, the high temperature threshold VTb, the temperature-increase-amount threshold $\Delta$VT, the first threshold, the second threshold, the third threshold, the battery voltage threshold, and the charging threshold, similarly to the above-described voltage difference threshold Vth, a threshold is set in each region so as to be different from the thresholds in other regions and so that the threshold in the first region is the smallest and the threshold in the third region is the largest. The thresholds in the three regions are prestored in a memory 52b in the present embodiment.

(6) Description of Charging Process

Figure 4:
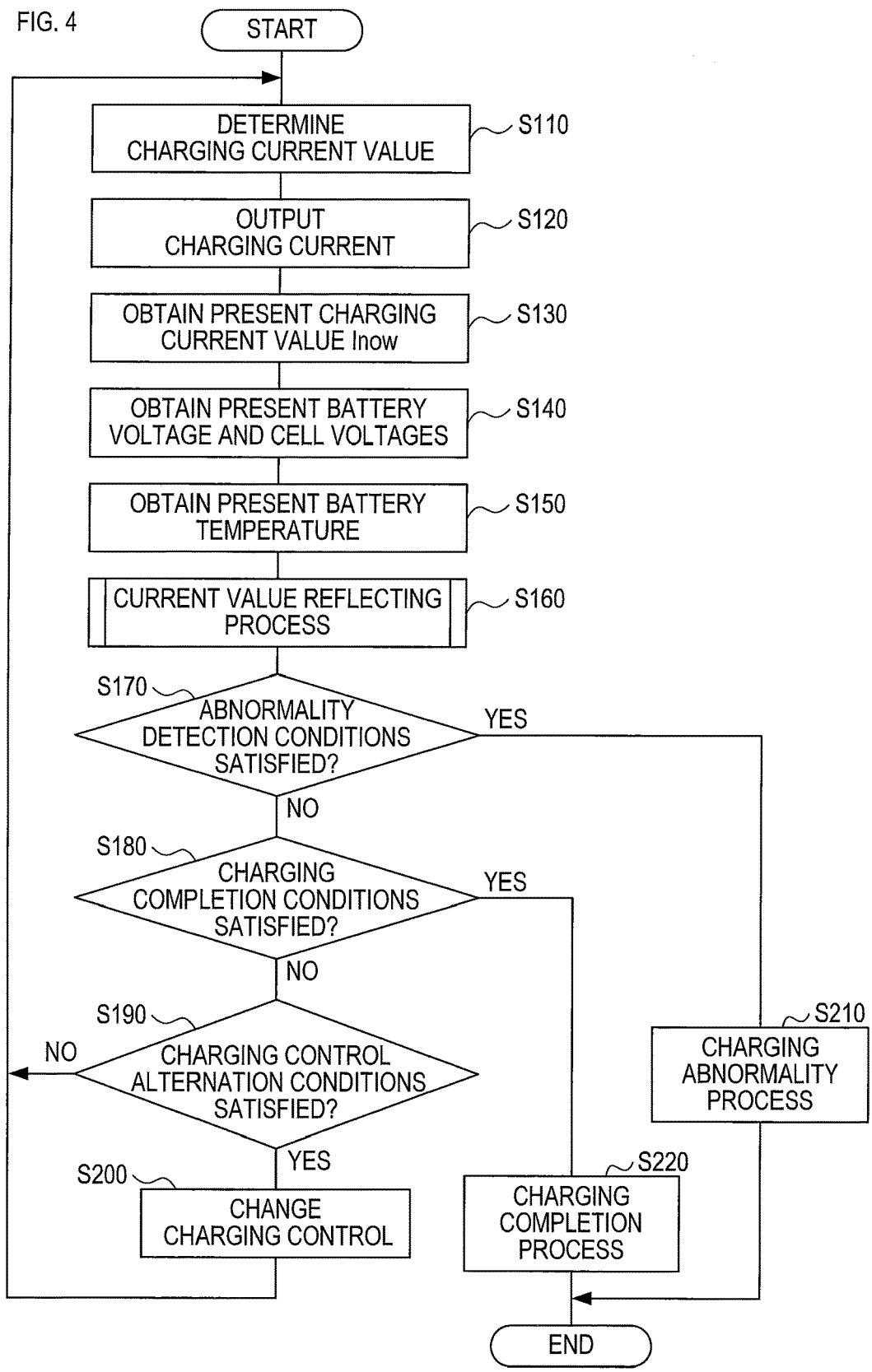
FIG. 4 is a flowchart of a battery charging process.

The following describes, with reference to FIG. 4, the charging process including the above-described charging control and the abnormality detection function that are executed by the control unit 52 of the battery charger 10. When the control unit 52 of battery charger 10 detects that the battery pack 1 is attached to the battery charger 10, the control unit 52 initiates the charging process shown in FIG. 4. To be specific, the charging process in FIG. 4 is executed by the CPU 52a reading the program for the charging process that is stored in the memory 52b.

The control unit 52 (more specifically the CPU 52a), upon detection of the attachment of the battery pack 1, initiates the charging process in FIG. 4. In S110, the control unit 52 determines the value of charging current. The process of S110 at the initiation of the charging process is to determine the value of charging current in the CC charging.

In S120, the charging current having the value determined in S110 is outputted from the SW power supply circuit 51 and supplied to the battery pack 1. The battery 30 is, accordingly, charged.

In S130, based on the current detection signal inputted from the current detection circuit 54, the present (actual) charging current value Inow is obtained. In S140, based on the above-described analog signals inputted from the battery pack 1, the current battery voltage value Vb and the cell voltage values V1, V2, and V3 are obtained. In S150, based on the battery temperature detection signal inputted from the battery pack 1, the current battery temperature is obtained.

In S160, the current value reflecting process is executed. The current value reflecting process according to the present embodiment is to, based on the present charging current value Inow obtained in S130, determine each of the above-described thresholds (the voltage difference threshold Vth, the low temperature threshold VTa, the high temperature threshold VTb, the temperature-increase-amount threshold $\Delta$VT, the first threshold, the second threshold, the third threshold, the battery voltage threshold, and the charging threshold) (this process corresponds to an example of a variable determination process for reference values according to the present disclosure). A specific example of the current value reflecting process in S160 is shown in FIG. 5.

Figure 5:
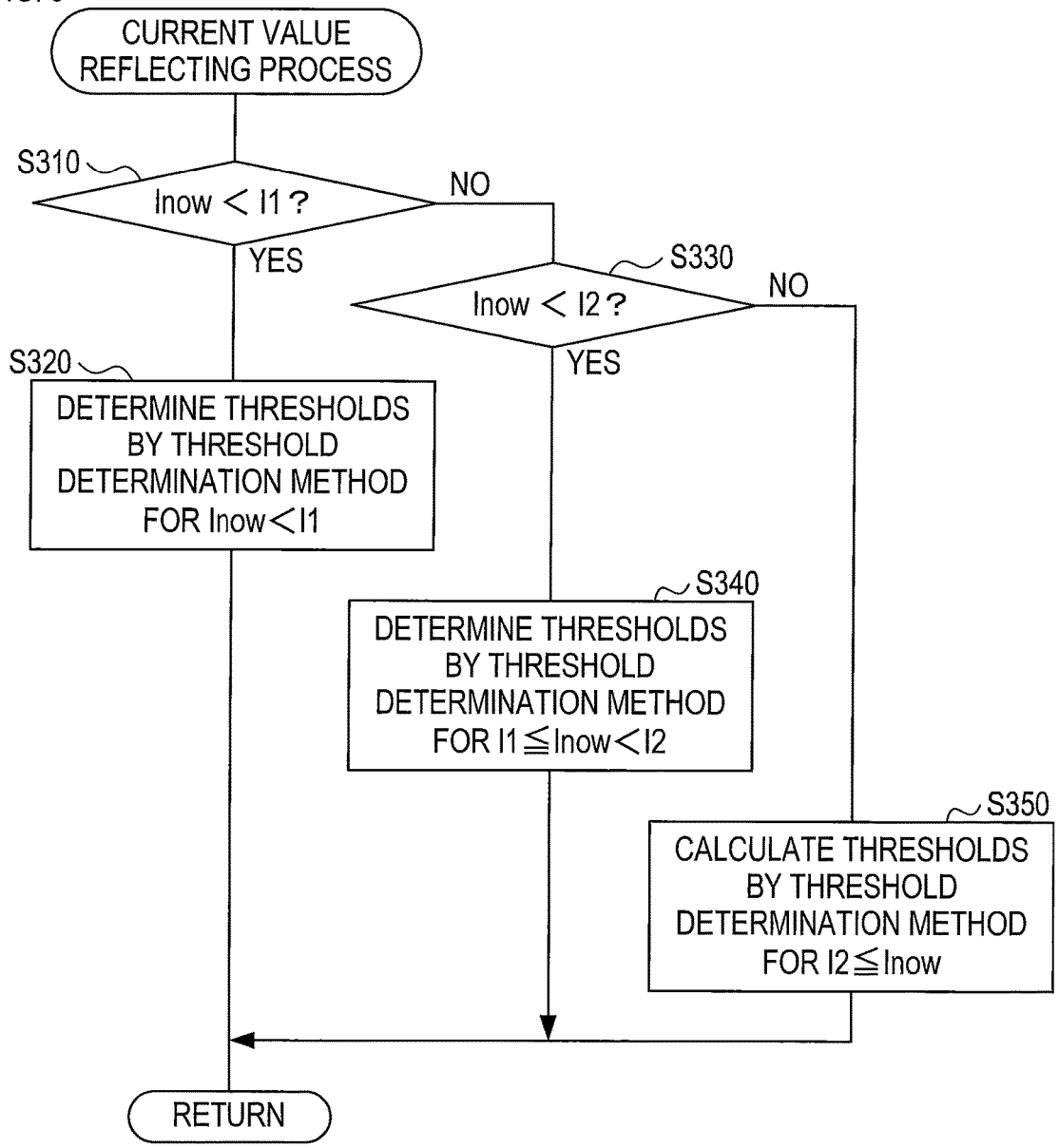
FIG. 5 is a flowchart of a current value reflecting process in the battery charging process shown in FIG. 4.

As shown in FIG. 5, when the current value reflecting process is initiated, in S310, it is determined whether the present charging current value Inow is smaller than I1 (i.e., within the first region). If it is determined that the present charging current value Inow is smaller than I1 (S310:YES), the process proceeds to S320. In S320, using the threshold determination method used in a case of Inow<I1, each of the above-described thresholds is determined. To be specific, in the present embodiment, each of the above-described thresholds that is stored in the memory 52b and corresponds to a case of Inow<I1 (i.e., corresponding to the first region) is read, and the read thresholds are determined to be the above-described thresholds. Following the process of S320, the process proceeds to S170 (FIG. 4).

In S310, if it is determined that the present charging current value Inow is equal to I1 or larger (S310:NO), the process proceeds to S320 in which it is determined whether the present charging current value Inow is smaller than I2 (i.e., within the second region). If it is determined that the present charging current value Inow is smaller than I2 (S320:YES), the process proceeds to S340. In S340, the threshold determination method used in a case of Inow being equal to I1 or larger and smaller than I2 (I1≤Inow<I2) is used so as to determine the above-described thresholds. To be specific, in the present embodiment, each of the above-described thresholds that is stored in the memory 52b and corresponds to a case of Inow(I1≤Inow<I1) (i.e., corresponding to the second region) is read, and the read thresholds are determined to be the above-described thresholds. Following the process of S340, the process proceeds to S170 (FIG. 4).

In S330, if it is determined that the present charging current value Inow is equal to I2 or larger (S330:NO), the process proceeds to S350. In S350, the threshold determination method for a case of Inow (Inow≥I2) described above is used so as to determine the above-described thresholds. To be specific, in the present embodiment, each of the above-described thresholds that is stored in the memory 52b and corresponds to a case of Inow (Inow≥I2) described above (i.e., corresponding to the third region) is read, and the read thresholds are determined to be the above-described thresholds. Following the process of S350, the process proceeds to S170 (FIG. 4).

In S170, it is determined whether abnormality detection conditions are met. To be specific, based on each of the thresholds determined in S160, each of the abnormality detection functions described above is performed, and it is determined whether any of the abnormalities (unbalanced-cell-voltage abnormality, temperature abnormality, temperature-increase-amount abnormality, and voltage abnormality) has occurred. If it is determined that any one of the abnormalities has occurred, or if it is determined that more than predetermined number of the abnormality has/have occurred (S170:YES), it is determined that abnormality detection conditions are met. Subsequently, the process proceeds to S210.

In S210, charging abnormality process is executed. The charging abnormality process is a predetermined process when abnormality is detected by the abnormality detection function. The process includes, for example, process to stop the output of the charging current from the SW power supply circuit 51, process to forcibly turn off the output FET 53, process to notify the user of abnormality detection by turning on the LED of the display unit 61.

In S170, if it is determined that abnormality detection conditions are not met (S170:NO), the process proceeds to S180. In S180, it is determined whether charging completion conditions are met. The charging completion conditions include, for example, the above-described CV charging completion conditions. Other charging completion conditions apart from the CV charging completion conditions may be set.

In S180, if it is determined that at least one or a predetermined number of the charging completion conditions are met (S180:YES), the process proceeds to S220. In S220, a charging completion process is performed. To be specific, the output of charging current from the SW power supply circuit 51 is stopped, and the output FET 53 is turned off. Successful charging completion may be notified to the user by, for example, turning on the LED of the display unit 61.

In S180, if it is determined that the charging completion conditions have not yet met (S180:NO), it is determined, in S190, whether charging control alternation conditions are met. To be specific, it is determined whether the switching conditions so as to switch the charging from the CC charging to the CV charging are met, that is, it is determined that the largest cell voltage value has reached the charging threshold. If it is determined that the conditions to switch the charging to the CV charging have not yet been met (S190:NO), the process goes back to S110 and the CC charging is continued. On the other hand, if it is determined that the switching conditions to switch the charging to the CV charging (S190:YES), the charging control method is changed in S200, specifically from the CC charging to the CV charging. Subsequently, the process goes back to S110. After switching to the CV charging, in the determination process in S190, a negative determination is given.

(7) Effect of Present Embodiment

The battery charger 10 according to the present embodiment is configured such that the ground for analog signals inputted from the battery pack 1 is shared with the ground for the charging current in common. This configuration may cause errors, which are generated from the charging current, to be included in the voltage values of analog signals. If respective thresholds are temporarily fixed to certain values and the fixed thresholds are used in performing the above-described abnormality detection functions and the switching determination from the CC charging to the CV charging, this may cause inappropriate results.

In consideration of this matter, the battery charger 10 of the present embodiment is configured to execute the current value reflecting process (S160) during the charging control so that at least some of the thresholds used in the charging control (in the present embodiment, the thresholds used in performing the above-described abnormality detection functions and the charging threshold) are determined variably corresponding to the value of the charging current. To be specific, the thresholds are determined such that the thresholds continuously or gradually increase with the increase of the charging current.

This configuration allows the battery charger 10 according to the present embodiment to determine appropriate thresholds in which the magnitude of voltage to be added to the voltage value of the analog signal due to the charging current is considered. The configuration also allows the battery charger 10 to perform the above-described abnormality detection functions and the charging control with these appropriate thresholds.

Therefore, the battery charger 10 can accurately perform various processes (including the abnormality detection functions and the charging control) based on the various analog signals inputted from the battery pack 1 while inhibiting the reduction in charging efficiency of the battery charger 10, an increase in the cost and the size of the battery charger 10.

In the present embodiment, the SW power supply circuit 51 corresponds to an example of a charging circuit of the present disclosure. The thresholds correspond to an example of a reference values of the present disclosure. The V1 input terminal 43, the V2 input terminal 44, or the temperature input terminal 45 all correspond to an example of at least one signal input terminal of the present disclosure. The control unit 52 corresponds to an example of an analog value acquisition device, a current value reflection processor, and a comparison processor of the present disclosure. The current detection circuit 54 corresponds to an example of a charging current detector of the present disclosure.

Other Embodiments

The above described an embodiment of the present disclosure. However, the present disclosure is not limited to the above-described embodiment, and may be carried out in various ways.

(1) In the current value reflecting process (S160), categorizing the charging current into three regions and a different threshold being determined in each region as described above is merely an example of a specific setting method for variably determining the thresholds corresponding to the value of the charging current for performing the abnormality detections functions.

For example, there may be two regions or four regions. Moreover, the number and the ranges of the regions may differ depending on the type of the thresholds as long as the setting is generally such that, irrespective of the number or the ranges of the regions, larger thresholds may be set as the charging current increases.

The thresholds may be continuously changed with respect to the charging current. For example, a function y=F(x) may be preset in which threshold y is a variable with respect to charging current x, and the thresholds may be calculated in accordance with the function. In this case, the relation between the charging current and the threshold may be linear or nonlinear. Moreover, linear and nonlinear variations may be mixed. Furthermore, continuous and noncontiguous variations may be mixed. For example, the thresholds may be determined to be constant when the charging current is within a certain range, and may be determined to be variable depending on the value of the charging current (for example, determined with a function formula), when the charging current is out of that range.

The values of the thresholds with respect to the value of the charging current may be calculated by numeric operation or may be stored in a memory as described above.

(2) The detail of the abnormality detection function, that is, the types of detectable abnormality are not limited to the types described in above. Moreover, the values variably determined based on the charging current are not limited to the above-described thresholds. Other values used by the control unit 52 for performing various controls may be variably determined with respect to the charging current.

(3) The current value reflecting process (S160) is not limited to the above-described process in which thresholds are variably determined so as to correspond to the value of the charging current. For example, a correction process (corresponding to an example of an analog value correction process of the present disclosure) may be performed in which thresholds are set to be constant values, and, in the current value reflecting process, analog values that are obtained based on the analog signals inputted from the battery pack 1 (the battery voltage value Vb, the cell voltage values V1, V2, and V3, and the voltage value of the battery temperature detection signal) are corrected so as to correspond to the value of the charging current. That is, correction is performed with respect to the obtained analog values so as to reduce the analog values. The correction process is constructed such that the reduction amount becomes large with the increase of the value of the charging current.

An example is shown in FIG. 6 regarding the current value reflecting process constructed so as to reduce the analog values correspondingly to the value of the charging current.

When the process proceeds to the current value reflecting process shown in FIG. 6, the control unit 52 of the battery charger 10 determines, in S410, whether the present charging current value Inow is smaller than I1 (i.e., falls within the first region). If it is determined that the present charging current value Inow is smaller than I1 (S410:YES), the process proceeds to S420. In S420, the above-described analog values are corrected with the correction method for the above-described charging current value (Inow<I1). For example, the battery voltage value Vb, the cell voltage values V1, V2, and V3 are corrected so as to be reduced by a predetermined reduction amount Vbd1. The voltage value of the battery temperature detection signal is corrected so as to be reduced by a predetermined reduction amount VTd1. Subsequently to the process S420, the process proceeds to S170 (FIG. 4).

In S410, if it is determined that the present charging current value Inow is equal to I1 or larger (S410:NO), the process proceeds to S420 in which it is determined whether the present charging current value Inow is smaller than I2 (i.e., within the second region). If it is determined that the present charging current value Inow is smaller than I2 (S420:YES), the process proceeds to S440. In S440, the above-described analog values are corrected by the above-described correction method used for a case of the charging current value Inow (I1≤Inow<I2). For example, the battery voltage value Vb and the cell voltage values V1, V2, and V3 are respectively corrected to be smaller by a predetermined reduction amount Vbd2 (>Vbd1). The voltage value of the battery temperature detection signal is corrected by a predetermined reduction amount VTd2 (>VTd1). Subsequently to the process in S440, the process proceeds to S170 (FIG. 4).

In S430, if it is determined that the present charging current value Inow is equal to I2 or larger (S430:NO), the process proceeds to S450 in which the analog values are corrected by the correction method used for a case of the charging current value Inow (Inow≥I2). For example, the battery voltage value Vb and the cell voltage values V1, V2, V3 are respectively corrected to be smaller by a predetermined reduction amount Vbd3 (>Vbd2). The voltage value of the battery temperature detection signal is corrected to be smaller by a predetermined reduction amount VTd3 (>VTd2). Subsequently to the process in S450, the process proceeds to S170 (FIG. 4).

The reduction amounts Vbd1, Vbd2, Vbd3, VTd1, VTd2, and VTd3 may be: each prestored in the memory 52b and obtained from the memory 52b, may be derived by predetermined calculation, or may be obtained from the outside of the battery charger 10.

Correction of the analog values corresponding to the value of the charging current in the current value reflecting process (S160) shown in FIG. 6 is merely an example, in which the value of the charging current is categorized in the three regions and the different reduction amount is set for each of the regions. The number and the ranges of the regions may be suitably determined as long as the setting is generally such that the reduction amount of the analog value becomes larger with the increase of the charging current. The reduction amount may be continuously changed with respect to the charging current.

(4) The types of the analog signal inputted from a battery pack to a battery charger is not limited to the four types (the signals inputted from the positive electrode terminal 41, the V1 input terminal 43, the V2 input terminal 44, the temperature input terminal 45) mentioned in the above-described embodiment. Apart from these types, other types of analog signals may be inputted. In a case where the comparison determination with thresholds is performed based on other types of analog signals, the thresholds may be variably determined based on the value of the charging current, or the values of the analog signals may be corrected based on the value of the charging current.

(5) Furthermore, the functions that one of the components according to the above-described embodiment has may be distributed to the functions of a plurality of components, or the functions that a plurality of components have may be integrated into the functions of one component. Moreover, at least some of the structure according to the above-described embodiment may be replaced with a known structure having the same functions. Some of the structure according to the above-described embodiment may be omitted. Moreover, at least some of the structure according to the above-described embodiment may be added to or replaced with the structure of other embodiments described above. It is noted that all embodiments included in the technical concept that is identified only by the language described in the claims are embodiments of the present disclosure.

What is claimed is:

1. A battery charger comprising:
an attachment portion configured such that a battery pack is to be detachably attached, the battery pack comprising: a battery having a positive electrode and a negative electrode; and at least one signal output terminal, the at least one signal output terminal being configured to output an analog signal with an analog value;
a charging circuit configured to generate charging current for charging the battery;
a positive electrode terminal configured to be electrically coupled to the positive electrode of the battery in the battery pack when the battery pack is attached to the attachment portion and to output the charging current generated in the charging circuit to the positive electrode;
a negative electrode terminal configured to be electrically coupled to the negative electrode of the battery in the battery pack when the battery pack is attached to the attachment portion and to receive the charging current generated in the charging circuit from the negative electrode, an electric potential of the negative electrode terminal being set to a reference potential of the charging circuit;
at least one signal input terminal configured to be electrically coupled to the at least one signal output terminal in the battery pack when the battery pack is attached to the attachment portion, wherein the at least one signal input terminal receives the analog signal from the at least one signal output terminal in the battery pack;
an analog value acquisition device configured to acquire the analog value of the analog signal inputted to the at least one signal input terminal, the analog value obtained by the analog value acquisition device corresponding to a voltage value of the analog signal with respect to the reference potential;
a charging current detector configured to detect a value of the charging current;
a comparison processor configured to make comparison of a target comparison value based on the analog value obtained by the analog value acquisition device with a predetermined reference value determined in the battery charger and to perform a predetermined process based on a result of the comparison;
a current value reflection processor configured to perform a variable determination process for reference values, the variable determination process for reference values being a process for the current value reflection processor to set the predetermined reference value based on the value of the charging current detected by the charging current detector.

2. The battery charger according to claim 1, wherein the analog value of the analog signal indicates an internal state of the battery pack.

3. The battery charger according to claim 1, wherein the current value reflection processor is configured to set the predetermined reference value in the variable determination process for reference values such that the predetermined reference value increases with the value of the charging current detected by the charging current detector.

4. The battery charger according to claim 1, wherein the battery comprises a plurality of cells, wherein the at least one signal output terminal comprises at least one cell voltage output terminal configured to output cell voltage signal, the cell voltage signal being an analog signal having an analog value that corresponds to a voltage value of one of the plurality of cells, wherein the at least one signal input terminal comprises at least one cell voltage input terminal configured to be electrically coupled to the at least one cell voltage output terminal when the battery pack is attached to the battery charger, wherein the at least one cell voltage input terminal receives the cell voltage signal from the at least one cell voltage output terminal, and wherein the analog value acquisition device is configured to acquire at least the analog value of the cell voltage signal inputted to the at least one cell voltage input terminal.

5. The battery charger according to claim 1, wherein the battery pack comprises a temperature detector configured to output voltage corresponding to temperature of the battery, wherein the at least one signal output terminal comprises a temperature signal output terminal configured to output a temperature signal, the temperature signal being an analog signal having an analog value corresponding to the voltage outputted from the temperature detector, wherein the at least one signal input terminal comprises a temperature signal input terminal configured to be electrically coupled to the temperature signal output terminal when the battery pack is attached to the battery charger, wherein the temperature signal input terminal receives the temperature signal from the temperature signal output terminal, and wherein the analog value acquisition device is configured to acquire at least the analog value of the temperature signal inputted to the temperature signal input terminal.

6. The battery charger according to claim 1, wherein the analog value acquisition device is configured to acquire an analog value corresponding to a voltage of the battery inputted from the battery pack to the positive electrode terminal.

7. The battery charger according to claim 1, wherein the comparison processor is configured to determine, upon performing the predetermined process, whether abnormality has occurred in the battery pack based on the result of the comparison while the charging current is outputted to the battery pack.

8. The battery charger according to claim 7, wherein the comparison processor is configured to perform, upon occurrence of the abnormality in the battery pack being determined, a process to stop output of the charging current from the charging circuit to the battery pack.

9. A control method of a battery charger comprising:

inputting at least one analog signal from a battery pack to a battery charger, the battery pack comprising a positive electrode, a negative electrode, and at least one analog signal output terminal, the at least one analog signal having an analog value and being inputted to the battery charger through the at least one analog signal output terminal in the battery pack;

acquiring the analog value of the at least one analog signal, the analog value corresponding to a voltage value of the at least one analog signal with respect to a reference potential of the battery charger;

outputting a charging current from the battery charger to the battery pack, the charging current fluctuating the voltage value of the at least one analog signal with respect to the reference potential;

detecting a value of the charging current;

comparing a comparison target value based on the acquired analog value with a predetermined reference value;

performing a predetermined process based on a result of the comparing of the comparison target value with the predetermined reference value; and performing one of a variable determination process for reference values and an analog value correction process, the variable determination process for reference values being a process to set the predetermined reference value based on the value of the detected charging current, the analog value correction process being a process to correct the analog value to be used in the comparing based on the detected value of the charging current.

10. A battery charger comprising:

an attachment portion configured such that a battery pack is to be detachably attached, the battery pack comprising: a battery having a positive electrode and a negative electrode; and at least one signal output terminal, the at least one signal output terminal being configured to output an analog signal with an analog value;

a charging circuit configured to generate charging current for charging the battery;

a positive electrode terminal configured to be electrically coupled to the positive electrode of the battery in the battery pack when the battery pack is attached to the attachment portion and to output the charging current generated in the charging circuit to the positive electrode;

a negative electrode terminal configured to be electrically coupled to the negative electrode of the battery in the battery pack when the battery pack is attached to the attachment portion and to receive the charging current generated in the charging circuit from the negative electrode, an electric potential of the negative electrode terminal being set to a reference potential of the charging circuit;

at least one signal input terminal configured to be electrically coupled to the at least one signal output terminal in the battery pack when the battery pack is attached to the attachment portion, wherein the at least one signal input terminal receives the analog signal from the at least one signal output terminal in the battery pack;

an analog value acquisition device configured to acquire the analog value of the analog signal inputted to the at least one signal input terminal, the analog value obtained by the analog value acquisition device corresponding to a voltage value of the analog signal with respect to the reference potential;

a charging current detector configured to detect a value of the charging current;

a comparison processor configured to make comparison of a target comparison value based on the analog value obtained by the analog value acquisition device with a predetermined reference value determined in the battery charger and to perform a predetermined process based on a result of the comparison;

a current value reflection processor configured to perform an analog value correction process, the analog value correction process being a process for the current value reflection processor to correct the analog value to be used in the comparison by the comparison processor based on the value of the charging current detected by the charging current detector.

11. The battery charger according to claim 10,
wherein the analog value of the analog signal indicates an internal state of the battery pack.

12. The battery charger according to claim 10,
wherein the battery comprises a plurality of cells,
wherein the at least one signal output terminal comprises at least one cell voltage output terminal configured to output cell voltage signal, the cell voltage signal being an analog signal having an analog value that corresponds to a voltage value of one of the plurality of cells,
wherein the at least one signal input terminal comprises at least one cell voltage input terminal configured to be electrically coupled to the at least one cell voltage output terminal when the battery pack is attached to the battery charger,
wherein the at least one cell voltage input terminal receives the cell voltage signal from the at least one cell voltage output terminal, and
wherein the analog value acquisition device is configured to acquire at least the analog value of the cell voltage signal inputted to the at least one cell voltage input terminal.

13. The battery charger according to claim 10,
wherein the battery pack comprises a temperature detector configured to output voltage corresponding to temperature of the battery,
wherein the at least one signal output terminal comprises a temperature signal output terminal configured to output a temperature signal, the temperature signal being an analog signal having an analog value corresponding to the voltage outputted from the temperature detector,
wherein the at least one signal input terminal comprises a temperature signal input terminal configured to be electrically coupled to the temperature signal output terminal when the battery pack is attached to the battery charger,
wherein the temperature signal input terminal receives the temperature signal from the temperature signal output terminal, and
wherein the analog value acquisition device is configured to acquire at least the analog value of the temperature signal inputted to the temperature signal input terminal.

14. The battery charger according to claim 10,
wherein the analog value acquisition device is configured to acquire an analog value corresponding to a voltage of the battery inputted from the battery pack to the positive electrode terminal.

15. The battery charger according to claim 10,
wherein the comparison processor is configured to determine, upon performing the predetermined process, whether abnormality has occurred in the battery pack based on the result of the comparison while the charging current is outputted to the battery pack.

16. The battery charger according to claim 15,
wherein the comparison processor is configured to perform, upon occurrence of the abnormality in the battery pack being determined, a process to stop output of the charging current from the charging circuit to the battery pack.

17. The battery charger according to claim 10,
wherein the current value reflection processor is configured to perform the analog value correction process, and
wherein the current value reflection processor is configured to reduce, in the analog value correction process, the analog value to be used in the comparison so that the analog value becomes smaller than the analog value of the analog signal inputted to the at least one signal input terminal.

18. The battery charger according to claim 17,
wherein the current value reflection processor is configured to reduce, in the analog value correction process, the analog value to be used in the comparison such that the greater the value of the charging current detected by the charging current detector increases, the greater the analog value to be used in the comparison is reduced.

* * * * *